3,150,192
HYDROGENATION OF ALDEHYDES USING RUTHENIUM CATALYST
Paul N. Rylander and Jay G. Kaplan, Newark, N.J., assignors to Engelhard Industries, Inc., Newark, N.J., a corporation of Delaware
No Drawing. Filed Oct. 31, 1960, Ser. No. 65,932
4 Claims. (Cl. 260—638)

This invention relates to the hydrogenation of aldehydes and more particularly to an improvement in the process for hydrogenating aldehydes in the presence of a ruthenium catalyst.

Heretofore, one difficulty encountered in the catalytic hydrogenation of aldehydes to alcohols has been the considerable decline in activity of the catalyst during the hydrogenation. Such difficulty has arisen with the use of ruthenium catalyst, this catalyst having its catalytic activity reduced to a relatively low order of activity during the hydrogenation of the aldehydes. This reduction in activity of the ruthenium catalyst is disadvantageous for the reasons that the hydrogenation rate falls off considerably and hence production of the desired hydrogenation products such as alcohol is considerably lowered.

In accordance with the present invention, it has now been found that the activity of the ruthenium catalyst can be restored when required during the hydrogenation and the hydrogenation rate can be maintained at a high level during the entirety of the hydrogenation, by a process involving treating the aldehyde with hydrogen in the presence of a catalyst containing Ru as catalytically active metal at a reaction temperature, periodically discontinuing the treating with hydrogen when the activity of Ru has been reduced to a relatively low order, and treating the ruthenium catalyst of reduced activity with a free oxygen-containing gas for a period sufficient to reactivate the catalyst. Hydrogen gas is then returned to the reactivated catalyst, and hydrogenation of the aldehyde proceeds at a favorable rate.

The particular time of the process at which the activity of the Ru catalyst has become reduced to a low order and requires reactivation is evidenced by a considerably lower hydrogen absorption rate. The period for the hydrogenation before discontinuing the same to reactivate the catalyst varies with conditions and may be a half hour or more.

The treatment of the de-activated ruthenium catalyst with the free oxygen-containing gas is preferably carried out by agitating the catalyst with the free oxygen-containing gas. Temperatures during the treatment with free oxygen-containing gas may be from about 10° C.–250° C., preferably from about 25° C.–100° C., and the pressure may be from 0–1000 p.s.i.g., preferably 0–50 p.s.i.g. The agitating of the catalyst with the free oxygen-containing gas is carried out in any stirred or shaken apparatus so that the gas is contacted with the catalyst. The time required for the reactivation will depend on the order of activity of the de-activated catalyst with lower orders of activity requiring longer treatment times. Treatment times with the free oxygen-containing gas may be a half minute or more, preferably from about 0.5–20 minutes. A typical number of reactivation treatments over a time of 280 minutes would be 8, over a period of 160 minutes 4, and over a period of 80 minutes 2 treatments.

The free oxygen-containing gas can be atmospheric air, oxygen per se or oxygen-enriched air, conveniently atmospheric air. The de-activated or partially de-activated ruthenium catalyst is treated with the free oxygen-containing gas during the preferred agitating in the proportions of about one or more moles of free oxygen per mole of catalytic metal, preferably from about ten moles or more of free oxygen per mole of catalytic metal.

It was unexpected and surprising that the de-activated ruthenium catalyst could be reactivated by treatment with the free oxygen-containing gas to again attain a high order of activity, in view of the fact that it is normally necessary to reduce the ruthenium catalyst by treatment with hydrogen prior to using it in the catalytic hydrogenation to make it active and thus operative. It is also surprising in view of the fact that supported Pd and Rh catalysts are made worse by this treatment with oxygen-containing gases.

It is pointed out that the reactivation treatment with the free oxygen-containing gas of the present invention is unlike the prior art regeneration of catalysts by burning off the carbonaceous deposits, inasmuch as the reactivation treatment of this invention does not produce the glowing or flame attendant with the burning. Indeed the mechanism of the reactivation treatment of the present invention is not definitely known. It was initially believed that the beneficial effects attained by contacting the ruthenium catalyst with air might be attributed to the flushing out of poisons, perhaps carbon monoxide. However, this seems not to be so inasmuch as shaking with nitrogen, instead of air, did not change the catalyst activity at all. It is possible that the effect is due to keeping the Ru in some preferred oxidation state; however, this has not been demonstrated.

The reaction temperatures for the hydrogenation may be from about 10° C.–250° C. preferably from about 25° C.–100° C., the pressure during the hydrogenation may be from atmospheric to about 2,000 p.s.i.g., and the process may be batch or continuous.

The catalytically active metal concentration may be from about 0.01–10 percent, preferably from about 0.1–5.0 percent by weight. The catalytically active metal is preferably supported on a carrier, which may be in the form of powder, extrudate, pellets or granules. Useful carriers include alkaline earth carbonates, e.g. calcium carbonate; oxides, e.g. zinc oxide; insoluble sulfates, e.g. barium sulfate; carbon; alumina; and silica.

Aldehydes which are hydrogenated in accordance with the present invention include aliphatic and aromatic aldehydes. In general, the aldehydes are those represented by the general formula

wherein R is $C_1$–$C_{18}$ alkyl or an aromatic radical. Such aldehydes include, for example, acetaldehyde, propionaldehyde, n-butyraldehyde, isobutyraldehyde, n-valeraldehyde, n-capronaldehyde, n-heptaldehyde, n-octyl aldehyde, nonyl aldehyde, n-decyl aldehyde, undecylenic aldehyde, lauryl aldehyde and the higher aliphatic aldehydes, benzaldehyde, toluylaldehyde, piperonal, naphthaldehyde, methoxybenzaldehyde, and other substituted aromatic aldehydes.

The invention will be further illustrated by reference to the following examples.

EXAMPLE I

A series of catalytic hydrogenation experiments for heptaldehyde at ambient temperature and one atmosphere pressure were performed to find the effect of the reactivation treatment of the Ru catalyst with free oxygen-containing gas. In each case 40 ml. of water, 50 ml. of $C_2H_5OH$, 10 ml. of heptaldehyde, and the specified amount of catalyst were charged to a one-liter, heavy-wall Erlenmeyer flask and the flask then placed in a shaker. The flask was capped and connected to a water filled gas burette system. The system was then evacuated, filled with $N_2$, evacuated again, again filled with $N_2$, and finally evacuated and filled with $H_2$. In the case of the Ru catalyst, the catalyst was pre-hydrogenated by treatment with hydrogen gas. i.e. the solvent and catalyst were shaken for one hour at room temperature and normal pressure with $H_2$ before the substrate was added; following this the flask was evacuated, the heptaldehyde placed in the flask and the same procedure of evacuation and gas addition previously described used before the hydrogenation run. Shaking was performed at the rate of 280 strokes per minute and a stroke amplitude of 2.5 inches.

Three catalysts were compared according to this procedure: (1) 1,000 mg. of 5 percent Ru on carbon catalyst, (2) 1,000 mg. of 5 percent Pt on carbon catalyst, and (3) 59.7 mg. of $PtO_2$ catalyst. In each case the catalyst was equivalent to 50 mg. of metal. Three runs were made on each of these catalysts as follows: (A) a control run in contact with $H_2$ as previously described, (B) a run in which 2 percent of $O_2$ (added as 10 percent air) was present in the $H_2$ added to the catalyst, and (C) runs in which the shaking was stopped and the hydrogen removed from the flask followed by filling the shaker with air and then shaking the flask for about two minutes at frequent intervals during the hydrogenation.

The following Table I shows milliliters of $H_2$ absorbed up to various periods following initiation of the hydrogenation. The periods for the (C) hydrogenations with intermittent shaking with air do not include the air shaking time.

*Table I*

Ml. OF $H_2$ ABSORBED AFTER MINUTES AS INDICATED

| Run No. | 10 | 40 | 80 | 160 | 280 |
|---|---|---|---|---|---|
| 1A | 200 | 600 | 825 | 1,110 | 1,330 |
| 1B | 280 | 750 | 1,100 | 1,325 | 1,530 |
| 1C | 200 | 725 | 1,275 | 1,530 | 1,570 |
| 2A | 50 | 175 | 325 | 475 | 735 |
| 2B | 65 | 225 | 420 | 625 | 1,000 |
| 2C | 75 | 250 | 440 | 650 | 1,025 |
| 3A | 15 | 35 | 40 | 60 | 85 |
| 3B | 15 | 50 | 60 | 90 | 130 |
| 3C | 25 | 65 | 75 | 110 | 160 |

Table I shows clearly: (1) superiority of the heptaldehyde hydrogenation rate for the carrier-based Ru catalyst over the carrier-based Pt catalyst and the $PtO_2$ catalyst, and (2) the superiority of the hydrogenations involving intermittent agitating with air at 80 minutes and longer over the hydrogenations with the $H_2$ initially containing 2 percent of $O_2$ admixed therewith and the $H_2$ alone of the control run.

It will be obvious to those skilled in the art that many modifications may be made within the scope of the present invention without departing from the spirit thereof, and the invention includes all such modifications.

What is claimed is:

1. A process for hydrogenating aldehydes to alcohols, which comprises reacting the aldehyde with hydrogen in the presence of a catalyst containing Ru as catalytically active metal at a reaction temperature from about 10° C. to 250° C., discontinuing the hydrogenation when the activity of the Ru has been reduced to a relatively low order of activity, treating the Ru catalyst of reduced activity in situ in the absence of any glowing or flame with a free oxygen-containing gas at a temperature of about 10° C. to 250° C. for a period sufficient to reactivate the catalyst, and using the reactivated catalyst in the aforesaid catalytic hydrogenation step, thereby to produce the corresponding alcohol.

2. A process in accordance with claim 1 wherein the free oxygen-containing gas is atmospheric air.

3. A process in accordance with claim 1 wherein the Ru catalyst of reduced activity is treated with free oxygen-containing gas by agitating the catalyst with the free oxygen-containing gas.

4. The process in accordance with claim 1 wherein the catalyst comprises a carrier having the catalytically active Ru metal supported thereon.

References Cited in the file of this patent

UNITED STATES PATENTS

| 2,517,916 | Pavlic | Aug. 8, 1950 |
| 2,617,709 | Cornell | Nov. 11, 1952 |